United States Patent [19]

Shimokawa et al.

[11] 4,350,788

[45] Sep. 21, 1982

[54] SYNTHETIC RESIN EMULSION AND ITS USES

[75] Inventors: Wataru Shimokawa, Hachioji; Yoshiaki Ito, Itami; Koichi Kobayashi, Ibaraki; Katuaki Fukumori, Kashiwa; Nobukazu Iwase, Tokyo, all of Japan

[73] Assignee: Nippon Gohsei Kagaku Kogyo Kabushiki Kaisha, Osaka, Japan

[21] Appl. No.: 252,900

[22] Filed: Apr. 10, 1981

[30] Foreign Application Priority Data

Sep. 26, 1980 [JP] Japan ............................... 55-134829

[51] Int. Cl.$^3$ ............................................. C08K 5/10
[52] U.S. Cl. ...................................... 524/309; 525/61
[58] Field of Search ................ 260/29.6 WA; 525/61

[56] References Cited

U.S. PATENT DOCUMENTS

| | | | |
|---|---|---|---|
| 2,227,163 | 12/1940 | Stark et al. | 260/32 |
| 2,398,344 | 4/1946 | Collins et al. | 260/32 |
| 2,536,980 | 1/1951 | Jones | 260/63 |
| 3,094,500 | 6/1963 | Herman | 260/29.6 |

FOREIGN PATENT DOCUMENTS

854191 11/1960 United Kingdom ...................... 2/6

*Primary Examiner*—Joseph L. Schofer
*Assistant Examiner*—Bernard Lipman
*Attorney, Agent, or Firm*—Armstrong, Nikaido, Marmelstein & Kubovcik

[57] ABSTRACT

A synthetic resin emulsion containing an acetoacetylated polyvinyl alcohol as a protective colloid, which has improved properties such as water resistance, freeze-thaw stability, stability at low temperatures, adhesive property and high viscosity even in low solid content. The emulsion is useful for various purposes such as adhesive, paper treating agent, paint, fiber and textile treating agent and cement modifier.

9 Claims, No Drawings

SYNTHETIC RESIN EMULSION AND ITS USES

BACKGROUND OF THE INVENTION

The present invention relates to an emulsion of a synthetic resin having improved properties.

Synthetic resin emulsions are useful as adhesives, coating materials, treating agents for fibers and textiles, treating agents for papers, hides and skins, binders for various materials, and modifiers for cement and mortar.

Although processes for the preparation of these synthetic resin emulsions are different somewhat from each other depending on the kinds of resins, the use of an emulsifier or protective colloid is essential in all cases. For instance, emulsions of vinyl resins such as polyvinyl acetate, acrylate polymers and polyvinyl chloride have been prepared by emulsion polymerization of a monomer in the presence of an emulsifier or protective colloid. Also, emulsions of polyester resins, epoxy resins or silicone resins have been prepared by admixing a solution of a resin or a molten resin with an aqueous solution of an emulsifier or protective colloid. Representative emulsifiers or protective colloids are non-ionic surface active agents, anionic surface active agents and water soluble resins, especially polyvinyl alcohol (hereinafter referred to as "PVA"). Since emulsions obtained by using surface active agents lack mechanical stability, PVA has been predominantly used as emulsifiers or protective colloids.

A partially hydrolyzed PVA having an average degree of hydrolysis of about 88% by mole provides emulsions having a large structural viscosity, a small dependency of viscosity stability on temperature change and a good stability in freezing or storage at low temperatures, but the emulsions are lacking in water resistance. On the other hand, in case of using a completely hydrolyzed PVA having an average degree of hydrolysis of about 99% by mole, the obtained emulsions have an excellent water resistance and a small structural viscosity, but are unstable in viscosity depending on temperature change and are poor in freezing stability or storage stability at low temperatures. Therefore, these both types of PVA emulsifiers or protective colloids have been selected in accordance with the uses of emulsions.

In recent years, however, there have been required emulsions having both properties of the partial hydrolysis type PVA and the complete hydrolysis type PVA. That is to say, there have been desired synthetic resin emulsions having an appropriate structural viscosity, a good water resistance, and a viscosity stability, namely a good stability in freezing or storage at low temperatures. In order to obtain such emulsions, it may be considered to combine the partial hydrolysis type PVA and the complete hydrolysis type PVA as an emulsifier or protective colloid. However, in many cases, undesirable properties appear rather than desirable properties from each PVA.

Accordingly, it is an object of the present invention to provide an improved emulsion of a synthetic resin.

A further object of the present invention is to provide a synthetic resin emulsion having both desirable properties of a partial hydrolysis type PVA and a complete hydrolysis type PVA as an emulsifier or protective colloid.

Another object of the present invention is to provide a synthetic resin emulsion suitable for various uses.

These and other objects of the present invention will become apparent from the description hereinafter.

DETAILED DESCRIPTION

It has now been found that an acetoacetylated polyvinyl alcohol (hereinafter referred to as "acetoacetylated PVA") is useful as an emulsifier or protective colloid capable of producing emulsions having the above-mentioned desirable properties.

According to the present invention, excellent effects as mentioned below can be obtained.

(1) The emulsions of the present invention have the freeze-thaw stability and storage stability at low temperatures.
(2) It is possible to obtain emulsions having a high viscosity even in low solid content.
(3) The films prepared from the emulsions of the present invention have excellent water resistance. The water resistance can be more easily increased by the use of a crosslinking agent such as aldehydes, amines or metal salts.
(4) The acetoacetylated PVA is usable in the same manner as PVA emulsifiers, and also is usable in combination with surface active agents.
(5) The emulsions have excellent cohesive forces with clay minerals and, therefore, are useful as adhesive for inorganic building materials. Also, waste water containing the emulsions of the invention can be easily treated with clay minerals such as clay.

The acetoacetylated PVA used as an emulsifier or protective colloid in the present invention is prepared by reaction of PVA with diketene as shown by the following reaction formula.

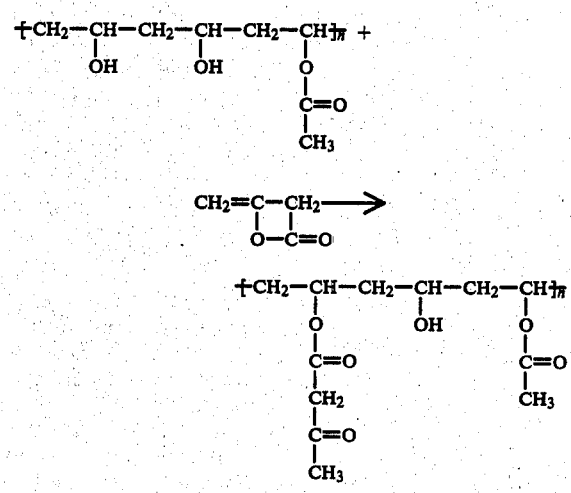

The reaction is usually carried out in a non-aqueous medium such as acetic acid, dimethylformamide or dioxane, and also, diketene in the form of gas or liquid is directly brought into contact with PVA powder. In the reaction, it is possible to use as a starting material a PVA modified with carboxyl group, amido group, nitro group, a carboxylic acid ester group or a hydrocarbon group as well as hydrolyzed polyvinyl acetate.

Although the acetoacetylated PVA is not particularly limited in its average degree of hydrolysis and average degree of polymerization, those having a content of residual acetyl group within the range of 0.1 to 15% by mole and an average degree of polymerization within the range of 500 to 2,600 are preferable from viewpoint of effects as a protective colloid. The content of acetoacetyl group in the acetoacetylated PVA is from 0.05 to 15% by mole, preferably 1 to 10% by mole. When the acetoacetyl content is less than 0.5% by mole, water resistance and viscosity stability is ineffective, and when the content is more than 15% by mole, it is hard to obtain uniform emulsion.

The feature of the present invention resides in that the acetoacetylated PVA is present in synthetic resin emulsions as an emulsifier to protective colloid. The acetoacetylated PVA is effective in an amount of from 0.1 to 30% by weight based on the resin in the emulsion, though the amount varies depending on the process for preparing emulsions, the kind and content of resins, and the like.

The emulsion of the present invention is prepared by any of the following three processes, i.e.

(1) a process in which a monomer is emulsion-polymerized by employing the acetoacetylated PVA as an emulsifier or a protective colloid [emulsion polymerization process], (2) a process in which a solution or molten liquid of a synthetic resin is post-emulsified in the presence of the acetoacetylated PVA [post-emulsification process], and (3) a process in which the acetoacetylated PVA is added to a synthetic resin emulsion prepared in an arbitrary manner to provicde a more stable emulsion [post-addition process].

The emulsion polymerization process (1) is suitable for the preparation of emulsions of vinyl polymers. Usual emulsion polymerization manner may be carried out, such that a vinyl monomer is added at one time or continuously to water medium in the presence of the acetoacetylated PVA and a polymerization initiator with heating and stirring. It is suitable that the amount of the acetoacetylated PVA is selected from 0.1 to 30% by weight, especially 2 to 20% by weight based on the resin produced. Below 2% by weight, sufficient effects are not obtained. The use in an amount more than 20% by weight is uneconomical, since the effects do not increase in proportion to amount. The acetoacetylated PVA may be added to the polymerization system at any time, i.e. at the time of starting the polymerization or in the course of the polymerization.

The vinyl monomers employed in the above process include, for instance, vinyl acetate, vinyl propionate, acrylates, methacrylates, vinyl chloride, vinylidene chloride, acrylonitrile, methacrylonitrile, styrene, ethylene, propylene, vinyl compounds containing glycidyl group such as glycidyl acrylate, glycidyl methacrylate, glycidyl divinyl ether and glycidyl vinyl ether, vinyl compounds containing methylol group such as N-methylolacrylamide and N-methylolmethacrylamide and their derivatives containing an alkoxymethyl group, e.g. methoxymethyl, ethoxymethyl or buthoxymethyl group, carboxylic acid amides such as acrylamide and methacrylamide, carboxylic acids, such as acrylic acid and methacrylic acid, divinyl adipate, divinyl succinate, triallyl cyanurate, diallyl fumarate, triallyl citrate, diallyl maleate, vinyl versatate, and the like. These monomers may be employed alone or in admixture thereof, and vinyl acetate homopolymer and copolymers are particularly preferred. In homopolymerization or copolymerization, use of vinyl monomers having N-methylol group or glycidyl group can provide self-crosslinking type emulsions. Emulsion polymerization catalysts are those used in a usual emulsion polymerization, and in particular, redox catalysts are preferable, such as combinations of hydrogen peroxide with formaldehyde zinc sulfoxylate, glyoxal zinc sulfoxylate or glyoxylic acid zinc sulfoxylate, and combinations of hydrogen peroxide, ammonium persulfate or potassium persulfate with sodium metabisulfite, sodium bisulfite, ferrous sulfate, dimethyl aniline, formaldehyde zinc sulfoxylate or formaldehyde sodium sulfoxylate.

In the emulsion polymerization, the acetoacetylated PVA may be employed in combination with non-ionic surface active agents or ionic surface active agents, and also in combination with other emulsifiers, e.g. PVA, cellulose derivatives such as carboxymethyl cellulose, hydroxyethyl cellulose and methyl cellulose, polyacrylic acid derivatives, maleic acid-vinyl ether copolymers, maleic acid-vinyl acetate copolymer, hydrolyzed copolymers of vinyl acetate with allylsulfonic acid, 2-methylallylsulfonic acid or their metal salts.

The post-emulsification process (2) is suitable for the preparation of emulsions of synthetic resins which are hard to prepare by emulsion polymerization. In this process, a solution of a resin or a molten resin is added dropwise to an aqueous solution of the acetoacetylated PVA with agitation, or an aqueous solution of the acetoacetylated PVA is added dropwise to a solution of a resin or a molten resin with agitation. In emulsification, heating is not particularly required, but if necessary, the temperature is maintained at from 45° to 85° C. The resins applicable to this process are not particularly limited, and for instance, there are mentioned resins such as epoxy resins, urethane resins, urea-formaldehyde precondensate, phenol-formaldehyde precondensate, alkyd resins, polyester resins, ketene dimer, silicone resins, waxes, polypropylene, polyethylene, and the like.

The amount of the acetoacetylated PVA is usually selected from 0.1 to 30% by weight, especially 1 to 25% by weight based on the resin to be emulsified. The acetoacetylated PVA may be employed in combination with non-ionic surface active agents such as polyoxyethylene-alkyl ethers, polyoxyethylene-alkyl phenols and polyhydric esters, or cationic surface active agents such as higher alkyl amine salts. These surface active agents are not always admixed with PVA, and they may be present in the resin to be emulsified.

The post-addition process (3) is usefully adopted for the purpose of improving the stability or increasing the viscosity of synthetic resin emulsions prepared in any known manners.

The emulsions of this process include, for instance, emulsions of styrene-butadiene resins, cis-1,4-polyisoprene, chloroprene resin, vinyl pyridine resin, methyl methacrylate-butadiene resin, polyurethane, acrylic ester resins, vinyl acetate resins, ethylenevinyl acetate resins, vinyl chloride resins, polystyrene, polyethylene, silicone resins, polybutene, Thiokols (commercial name, products of Thiokol Chemical Corp.), and the like.

When the acetoacetylated PVA is employed in the form of an aqueous solution, it is admixed with an emulsion at room temperature. When the acetoacetylated PVA is added in the form of powder, it is desirable that the powder is added to an emulsion with agitation and is then admixed at a temperature of 60° to 80° C., since uniform admixing is completed in a short period of time.

The amount of the acetoacetylated PVA is from 0.1 to 30% by weight, especially 0.1 to 10% by weight based on the resin of the emulsion used.

The synthetic resin emulsion prepared by the above-mentioned processes (1), (2) and (3) may further contain additives, e.g. plasticizers, accelerator for film formation such as high boiling solvents, extender pigments such as clay, calcium carbonate, kaolin and diatomaceous earth, color pigments such as titanium dioxide, preservatives, insecticides, antirusts and viscosity promoters.

Also, the use of a crosslinking agent is further effective for increasing the water resistance. The crosslinking agents include, for instance, metal compounds such as oxides, hydroxides, basic salts, acidic salts, neutral salts and amine complexes of beryllium, zirconium, titanium, chromium, calcium, magnesium, zinc, barium, strontium, aluminum, bismuth, antimony, cobalt, iron and nickel, dimethylol derivatives of formaldehyde, glyoxal, urea and melamine, and the like. Preferably metal compounds as crosslinking agents are zinc acetate, zinc oxide, zinc glycinate, chromium nitrate, titanyl sulfate, zinc carbonate, aluminum chloride, zinc benzoate, zinc salicylate, zinc glycolate, calcium hydroxide, magnesium oxide and titanium lactate.

For the purpose of increasing viscosity, a water-soluble high molecular material may be incorporated into the emulsion of the present invention. The amount of the high molecular material is usually from 5 to 500% by weight based on the solid content of the emulsion. The water-soluble high molecular materials include PVA, PVA derivatives, starches, cellulose derivatives such as carboxymethyl cellulose, hydroxyethyl cellulose, hydroxymethyl cellulose and methyl cellulose, casein, and the like. These high molecular materials may be employed in any suitable forms, e.g. aqueous solution and powder.

The synthetic resin emulsions of the present invention are useful for a variety of purposes, including paper treating agents, adhesives, coating materials, fiber and textile treating agents, cosmetics, civil engineering and building materials, cement modifiers, sealants, casting products, carpet packing agents, flocking agents and jointing agents for civil engineering. The emulsions are particularly useful as adhesives for cellulose structural materials such as woods or papers, especially water resistant corrugated cardboards and plywoods. Also, high-speed adhesion is possible because the viscosity of the emulsions can be easily increased.

With respect to each of the uses, the synthetic emulsions of the present invention are more particularly explained below.

Adhesive for Woodwork, particularly Plywoods

Hitherto, emulsions of vinyl acetate resins have been commonly employed as adhesives for woodworks or plywoods. The emulsions containing the acetoacetylated PVA as a protective colloid of the present invention have the following advantages as compared with a polyvinyl acetate emulsion containing PVA as a protective colloid.

(1) The emulsions of the invention are superior in wet adhesive strength in a boiling water as well as in a hot water. Moreover, they have a higher adhesive strength under repeated boiling water test than emulsion containing a urea resin.

(2) The emulsions of the invention have an excellent viscosity stability at low temperatures, an excellent miscibility with urea resin and a high viscosity even in low solid contents.

In the preparation of woodworks, there is employed a usual manner such as applying an adhesive to a wood, adhering another wood thereto and then drying. As occasion demands, there can be adhered papers, fiber products and films to woody materials.

The preparation of plywoods is usually carried out by employing the adhesives of the present invention as follows: The adhesive is coated to a veneer by a known coater such as a double roller, a glue spreader, or a double roller or glue spreader equipped with a doctor roller. Any kinds of veneers are applicable, but a particularly excellent adhesion force is obtained in adhesion of lauan. The coating amount is not particularly limited, but in general is selected from 20 to 250 g./m.$^2$, especially 50 to 150 g./m.$^2$ as a solid content, since no sufficient adhesion force is obtained below 20 g./m.$^2$, and the adhesion force does not increase in proportion to its amount more than 250 g./m.$^2$ The coated veneers are put in layers and dried under pressure to adhere them. It is possible to adhere two or more sheets of veneers. The drying may be conducted at any temperatures, i.e. at room temperature or above. However, the drying is desirably conducted at a temperature of 20° to 150° C., especially 20° to 120° C. in order to shorten the drying time and to obtain more effective water resistance. Deterioration of veneers takes place at a temperature higher than 150° C. In drying, the pressure of 5 to 15 kg./cm.$^2$ and the time of 10 minutes to 24 hours are sufficient. After the completion of the adhesion, the obtained plywood may be treated in a finishing step, as occasion demands, e.g. sawing off into a desired size and surface treatment for the uniform surface and the precise thickness. In these treatments, any known machines are usable, e.g. sawing machines such as a circular sawing machine and a double sizer, and surface finishing machine such as a scraper, a belt sander, a drum sander and a wide belt sander.

Adhesive for Corrugated Cardboard

In the preparation of corrugated cardboards, the emulsions of the present invention used as adhesives are applied to a corrugating medium usually in an amount of 8 to 25 g./m.$^2$ as a solid content. The corrugating medium coated with an adhesive is adhered with liners with heating by, for instance, a heating roll, preferably under pressure. The heating roll temperature is usually selected from 100° to 200° C., and the pressure is usually selected from 2 to 7 kg./cm.$^2$ It is advantageous to use the emulsions of the invention in combination with vinyl alcohol resins in the form of powder, preferably those insoluble in cold water but soluble in hot water. Further, in that case, the addition of a gelling agent acting on the vinyl alcohol resins at adhesion temperatures, e.g. boric acid and borax, is desirable, in order to increase initial adhesion force and prevent resins from penetrating into the paper layer. If necessary, the emulsions of the invention used as adhesives may further contain extenders such as starch powder, clay, calcium carbonate and diatomaceous earth, pigments, pH controlling agents such as alkali carbonates and alkali phosphates, water resisting agents such as urea-formaldehyde precondensate, melamine-formaldehyde precondensate, N-methylol group-containing compounds, glyoxal and dialdehyde starch, plasticizers such as ethylene glycol and glycerin, and the like.

Fiber and Textile Treating Agents

The emulsions of the present invention are useful as agents for treating fibers and textiles, e.g. natural fibers such as cotton, silk and wool, and various synthetic fibers such as polyamide, polyester, polyacrylate, polyvinyl chloride and polypropyrene.

The fibers and textiles may be treated in such a manner as coating, e.g. roll coating, spraying or dipping of a treating agent solution. The treated fibers or textiles are then dried by heating. It is possible to employ the emulsions of the invention in combination with a crosslinking agent in order to treat more effectively. In that case, the crosslinking reaction is sufficiently proceeded by heating at a temperature of 100° to 170° C.

The treating agents of the present invention can impart excellent effects on softness, springy property, fastness to dry cleaning, mechanical strength and adhesive strength to fibers and textiles. Moreover, since the treating agents have good water resistance, the fastness to washing is very excellent and perpetual. Therefore, the emulsions of the invention can be utilized in various purposes as fiber and textile treating agents, e.g. for crease proofing, shrink proofing, soft finishing, flocking, pigment printing, resin finishing of non-woven fabric and general adhesive treatment.

Coating Materials

The emulsions of the present invention provide good coatings, and are availably employed as coating materials or paints. They may be applied to various materials in usual coating manners such as brushing, spraying, roller coating and dipping. The emulsions of the invention exhibit good adhesive property and good filling property to wood, wall, wall paper, concrete, plaster, stone, metal and mortar, and are particularly suitable for coating of general buildings, interior coating of ships and vehicles, and coating of sickrooms and cuisines. The objects to be coated are not limited to the abovementioned. And the emulsions of the invention are usually employed for interior coating, and are also applicable to exterior coating such as road.

The coating materials or paints of the present invention may contain, as occasion demands, additives, e.g. extender pigments such as calcium carbonate, clay, talk, mica, palaite and zirkelite, color pigments such as titanium white, iron oxide red, carbon, Chinese yellow, Cyanine Blue and Hansa Yellow, volatile film-forming aids such as cellosolve acetate and butylcarbitol acetate, anti-freezing agents such as ethylene glycol, plasticizers, dispersing agents, anti-foaming agents, viscosity promoters such as alkalis, and preservatives.

Paper Coating Agents

The emulsions of the present invention having a solid content of 2 to 60% by weight are useful for paper coating from viewpoint of workability. Papers to be coated are not limited, but there are preferred paper boards such as manila board, white board and linerboard, and printing papers such as usual fine papers and gravure printing paper.

The emulsion may be coated onto a paper in any known manners such as roll coater process, air doctor process and blade coater process. The amount of the coating is suitably selected from 0.5 to 30 g./m.$^2$, preferably 1 to 20 g./m.$^2$ as a solid content.

The emulsion may contain, as occasion demands, known additives, e.g. water resisting agents such as glyoxal and melamine-formaldehyde resin, polyvalent metal salts, plasticizers such as glycols and glycerin, anti-foaming agents, release agents and surface active agents.

Although the emulsions of the invention are availably employed in clear coating of papers, it is also possible to employ them in pigment coating by suitably adding pigments such as clay, titanium dioxide and satin white thereto.

Modifiers for Cement

Concrete structures obtained by molding a mixture of cement, an aggregate such as sand, small stone or broken stone, and water, and cement products such as block, pile, mortar and slate have been widely used in the fields of civil engineering and construction. But they are not sufficient in mechanical strength, water resistance and chemical resistance.

In order to improve these defects, the emulsions of the present invention can be availably employed as cement modifiers.

The modifiers give cement products having not only excellent mechanical strengths such as tensile strength, flexural strength and compression strength, but also good characteristics such as impact resistance, abrasion resistance, adhesive property to old concrete surface and weather resistance.

The modifiers of the invention are stable even under an alkaline condition and, therefore, it is possible to directly add to cement at the time of producing concretes and its analogs. The amount of the modifiers is selected from 2 to 40% by weight as solid resin based on the cement. The amount less than 2% by weight is ineffective, and the amount more than 40% by weight decreases the mechanical strengths and also is uneconomical.

The present invention is more particularly described and explained by means of the following Examples, in which all parts and % are by weight unless otherwise noted.

EXAMPLE 1

A separable flask equipped with a stirrer, a reflux condenser, a dropping funnel and a thermometer was charged with 131.3 parts of water, 11.5 parts of an acetoacetylated PVA (average degree of polymerization: 1,700, residual acetyl content: 1% by mole, acetoacetyl content: 2.3% by mole), and 10 parts of vinyl acetate monomer. The temperature was raised to 60° C. with agitation, while replacing air in the flask with nitrogen gas. The polymerization was started by adding 2 ml. of a 10% aqueous solution of hydrogen peroxide and 3 ml. of a 10% aqueous solution of tartaric acid. After the initial polymerization for 30 minutes, the polymerization was further continued with adding dropwise 90 parts of vinyl acetate monomer over 3 hours. The reaction mixture was then maintained at 70° C. for 1 hour to complete the polymerization, and was cooled to give an emulsion. The obtained emulsion had a good flowability.

The results of the measurement of properties of the emulsion are shown in Table 1.

COMPARATIVE EXAMPLE 1

The procedure of Example 1 was repeated except that PVA having an average degree of polymerization of 1,700 and a residual acetyl content of 1% by mole was employed instead of the acetoacetylated PVA.

The properties of the obtained emulsion are shown in Table 1.

EXAMPLE 2

The initial polymerization was carried out in the same manner as in Example 1 by employing 155.5 parts of water, 7.0 parts of an acetoacetylated PVA (average degree of polymerization: 1,800, residual acetyl content: 12% by mole, acetoacetyl content: 1.6% by mole), and 10 parts of vinyl acetate monomer. Then, 90 parts of vinyl acetate monomer was added dropwise over 2 hours, and the reaction mixture was further maintained at 75° C. for 1 hour to complete the polymerization and was then cooled.

The properties of the obtained emulsion are shown in Table 1.

COMPARATIVE EXAMPLE 2

The procedure of Example 2 was repeated except that PVA having an average degree of polymerization of 1,800 and a residual acetyl content of 12% by mole was employed instead of the acetoacetylated PVA.

The properties of the obtained emulsion are shown in Table 1.

EXAMPLE 3

The same flask as in Example 1 was charged with 11.0 parts of an acetoacetylated PVA (average degree of polymerization: 1,400, residual acetyl content: 1% by mole, acetoacetyl content: 5.9% by mole), 0.5 part of polyoxyethylene nonylphenol ether (commercial name "Emulgene 950", product of Kao Soap Co., Ltd.), 70 parts of vinyl acetate monomer, 30 parts of butyl acrylate and 101.5 parts of water. To the flask were added 5 ml. of a 5% aqueous solution of ammonium persulfate and 5 ml. of a 5% aqueous solution of sodium bisulfite, and the emulsion polymerization was carried out first at a temperature of 40° to 50° C. for 30 minutes and then at a temperature of 180° to 185° C. for 3 hours under a nitrogen atmosphere.

The properties of the emulsion are shown in Table 1.

COMPARATIVE EXAMPLE 3

The procedure of Example 3 was repeated except that PVA having an average degree of polymerization of 1,400 and a residual acetyl content of 1% by mole was employed instead of the acetoacetylated PVA.

The properties of the emulsion are shown in Table 1.

EXAMPLE 4

A polymerization autoclave was charged with 100 parts of water and 8 parts of an acetoacetylated PVA (average degree of polymerization: 1,800, residual acetyl content: 1% by mole, acetoacetyl content: 3.5% by mole). After raising the temperature to 65° C. to dissolve the acetoacetylated PVA, ethylene was supplied up to 30 kg./cm.$^2$ and the temperature was raised to 75° C. The emulsion polymerization was carried out by adding dropwise 40 parts of vinyl chloride, 45 parts of vinyl acetate and 8 parts of a 5% aqueous solution of ammonium persulfate over 5 hours, while maintaining the above pressure by the supply of ethylene. After reducing the ethylene pressure to ordinary pressure, the polymerization was further continued for 1 hour, and the solid content of the obtained emulsion of ethylenevinyl acetate-vinyl chloride copolymer was then adjusted to 50%.

The properties of the emulsion are shown in Table 1.

EXAMPLE 5

A polymerization vessel was charged with 100 parts of water and 8 parts of the same acetoacetylated PVA as in Example 4, and the temperature was raised to 65° C. to dissolve the acetoacetylated PVA. After raising the temperature to 75° C., 50 parts of a vinyl ester of versatic acid (commercial name "Veova", product of Shell Chemical Co.), 50 parts of vinyl acetate and 8 parts of a 5% aqueous solution of ammonium persulfate were simultaneously added dropwise over 3.5 hours, and the polymerization was further continued for 1 hour. The solid content of the obtained emulsion of vinyl acetate-Veova copolymer was adjusted to 50%.

The properties of the emulsion are shown in Table 1.

EXAMPLE 6

A 50% emulsion of butyl acrylate-styrene copolymer was prepared in the same manner as in Example 5 except that 60 parts of butyl acrylate and 40 parts of styrene were employed as monomers and 0.2 part of tert-dodecylmercaptane was employed as a chain transfer agent.

The properties of the emulsion are shown in Table 1.

TABLE 1

| | Polymer | Acetoacetylated PVA | | | Solid content of emulsion (%) |
| --- | --- | --- | --- | --- | --- |
| | | Acetoacetyl content (mole %) | Residual acetyl content (mole %) | Average degree of polymerization | |
| Ex. 1 | polyvinyl acetate | 2.3 | 1 | 1700 | 44.8 |
| Ex. 2 | polyvinyl acetate | 1.6 | 12 | 1800 | 39.1 |
| Ex. 3 | vinyl acetate-butyl acrylate copolymer | 5.9 | 1 | 1400 | 49.9 |
| Ex. 4 | ethylene-vinyl acetate-vinyl chloride copolymer | 3.5 | 1 | 1800 | 50.0 |
| Ex. 5 | vinyl acetate-Veova copolymer | 3.5 | 1 | 1800 | 50.0 |
| Ex. 6 | butyl acrylate-styrene copolymer | 3.5 | 1 | 1800 | 50.0 |
| Com. Ex. 1 | polyvinyl acetate | — | 1 | 1700 | 45.0 |
| Com. Ex. 2 | polyvinyl acetate | — | 12 | 1800 | 39.4 |
| Com. Ex. 3 | vinyl acetate-butyl acrylate | — | 1 | 1400 | 50.1 |

TABLE 1-continued

| | copolymer | | | | |
|---|---|---|---|---|---|
| | Viscosity of emulsion (cP) | Structural viscosity | Freeze-thaw stability | Stability at low temperature | Water resistance (%) |
| Ex. 1 | 52,900 | 0.64 | B | B | 0.6 |
| Ex. 2 | 37,000 | 0.63 | A | A | 7.4 |
| Ex. 3 | 26,000 | 0.51 | B | B | 0.8 |
| Ex. 4 | 5,600 | 0.65 | B | B | 0.5 |
| Ex. 5 | 12,000 | 0.82 | B | B | 0.4 |
| Ex. 6 | 3,400 | 0.64 | B | B | 0.2 |
| Com. Ex. 1 | 5,900 | 0.11 | D | D | 1.4 |
| Com. Ex. 2 | 9,640 | 0.56 | C | B | nonmeasurable (dissolution of film) |
| Com. Ex. 3 | 2,200 | 0.07 | D | D | 3.3 |

NOTE:
1. Viscosity of emulsion is measured by a BH type rotation viscometer at 10 r.p.m. in number of rotation of rotor at 30° C.
2. Structural viscosity indicates a logarithmic value of a ratio of viscosity measured at 2 r.p.m. to viscosity measured at 20 r.p.m.
3. Freeze-thaw stability is estimated on the basis of the following criteria in a test according to Japanese Industrial Standard (hereinafter referred to as "JIS") K 6826 in which about 100 g. of an emulsion is put into a polyethylene bottle, maintained at −15° C. for 16 hours., and then allowed to stand in a constant temperature water bath at 30° C. for 1 hour, and after stirring with a glass rod, the appearance of the emulsion is observed.
A: State of emulsion is very good.
B: State of emulsion is good.
C: State of emulsion is slightly good.
D: State of emulsion is bad.
4. Stability at low temperatures is estimated according to the following criteria in a test in which about 100 g. of an emulsion is placed in a thermostat maintained at 0° C. for 5 days, and after stirring the emulsion with a glass rod, viscosity change is observed.
A: No viscosity change
B: A little viscosity change
C: Slightly large viscosity changeD: Large viscosity change
5. Water resistance indicates the elution percentage of a film prepared from an emulsion. The film previously subjected to dry heat treatment at 100° C. for 10 minutes is immersed in water at 30° C. for 24 hours and the elution percentage is calculated by weight change of the film before and after immersion.

EXAMPLE 7

To 100 parts of an ethylene-vinyl acetate copolymer emulsion (solid content: 50%, viscosity: 530 cP) was added 2.5 parts of an acetoacetylated PVA (average degree of polymerization: 1,700, residual acetyl content: 1% by mole, acetoacetyl content: 5.4% by mole), and they were admixed.

The properties of the thus prepared emulsion are shown in Table 2.

EXAMPLES 8 TO 13

To 100 parts of a polyvinyl acetate emulsion (solid content: 50%, viscosity: 7,400 cP) was added an acetoacetylated PVA (average degree of polymerization: 1,700, residual acetyl content: 1% by mole, acetoacetyl content: 2.3% by mole) in an amount of 1 part (Example 8), 2 parts (Example 9) or 6 parts (Example 10), and they were admixed.

Also, to 100 parts of the above polyvinyl acetate emulsion was added an acetoacetylated PVA (average degree of polymerization: 1,800, residual acetyl content: 12% by mole, acetoacetyl content: 1.6% by mole) in an amount of 1 part (Example 11), 2 parts (Example 12) or 6 parts (Example 13), and they were admixed.

The properties of the obtained emulsions are shown in Table 2.

COMPARATIVE EXAMPLES 4 TO 6

Emulsions were prepared in the same manner as in Examples 7 and 9 except the use of PVA having an average degree of polymerization of 1,700 and a residual acetyl content of 1% by mole (Comparative Examples 4 and 5), and in the same manner as in Example 12 except the use of PVA having an average degree of polymerization of 1,800 and a residual acetyl content of 12% by mole (Comparative Example 6), respectively, instead of the acetoacetylated PVA.

The properties of the obtained emulsions are shown in Table 2.

TABLE 2

| | Emulsion used | | Acetoacetyl content of AA-PVA*3 (mole %) | Amount of AA-PVA or PVA (part/ 100 parts of emulsion) | Properties of emulsion | | | |
|---|---|---|---|---|---|---|---|---|
| | Resin | Viscosity (cP) | | | Viscosity (cP) | Structural viscosity | Stability at low temp. | Water resistance (%) |
| Ex. 7 | E-VAc*1 | 530 | 5.4 | 2.5 | 1,500 | 0.38 | B | 0.3 |
| Ex. 8 | VAc*2 | 7,400 | 2.3 | 1 | 8,200 | 0.16 | B | 0.9 |
| Ex. 9 | " | " | 2.3 | 2 | 10,400 | 0.21 | B | 1.1 |
| Ex. 10 | " | " | 2.3 | 6 | 19,600 | 0.29 | B | 0.8 |
| Ex. 11 | " | " | 1.6 | 1 | 7,700 | 0.16 | A | 7.3 |
| Ex. 12 | " | " | 1.6 | 2 | 9,400 | 0.20 | A | 7.6 |
| Ex. 13 | " | " | 1.6 | 6 | 13,200 | 0.25 | A | 7.9 |
| Com. Ex.4 | E-VAc | 530 | — | 2.5 | 600 | 0.22 | D | 3.6 |

TABLE 2-continued

| | Emulsion used | | Acetoacetyl content of AA-PVA*3 (mole %) | Amount of AA-PVA or PVA (part/ 100 parts of emulsion) | Properties of emulsion | | | |
|---|---|---|---|---|---|---|---|---|
| | Resin | Viscosity (cP) | | | Viscosity (cP) | Structural viscosity | Stability at low temp. | Water resistance (%) |
| Com. Ex. 5 | VAc | 7,400 | — | 2 | 8,800 | 0.14 | D | 3.8 |
| Com. Ex. 6 | " | " | — | 2 | 8,000 | 0.13 | B | non-measurable |

(Note)
*1E-VAc: Ethylene-vinyl acetate copolymer
*2VAc: Vinyl acetate homopolymer
*3AA-PVA: Acetoacetylated PVA
The measurement of properties of emulsion is the same as in Table 1.

EXAMPLE 14

In 31.0 g. of hot water of 50° C. was dissolved 4.0 g. of an acetoacetylated PVA (average degree of polymerization: 500, residual acetyl content: 1.3% by mole, acetoacetyl content: 2.3% by mole). To the resulting solution, 65 g. of a liquid Bisphenol A type epoxy resin (commercial name "Epikote 828", product of Shell Chemical Co.) solution of about 50° C. was gradually added with vigorous agitation by a high-speed mixer to give an epoxy resin emulsion.

The properties of the emulsion are shown in Table 3.

COMPARATIVE EXAMPLE 7

The procedure of Example 14 was repeated except that PVA (average degree of polymerization: 500, residual acetyl content: 1.3% by mole) was employed instead of the acetoacetylated PVA.

The properties of the obtained emulsion are shown in Table 3.

EXAMPLE 15

In 82 parts of water was dissolved 8 parts of an acetoacetylated PVA (average degree of polymerization: 1,700, residual acetyl content: 1.9% by mole, acetoacetyl content: 3% by mole). The solution was maintained at 65° C., and thereto a previously molten hexadecylketene dimer was gradually added and was emulsified by means of a homogenizer to give a ketone dimer emulsion.

The properties of the emulsion are shown in Table 3.

COMPARATIVE EXAMPLE 8

The procedure of Example 15 was repeated except that PVA (average degree of polymerization: 1,700 residual acetyl content: 1.9% by mole) was employed instead of the acetoacetylated PVA.

The properties of the obtained emulsion are shown in Table 3.

EXAMPLE 16

By a pressure kneader, 15 parts of the same acetoacetylated PVA as used in Example 15, 15 parts of water and 100 parts of atactic polypropylene (average molecular weight: 18,000) were blended at 90° C. for 20 minutes. The concentration of the mixture was then adjusted by adding water to give a polypropylene emulsion having a solid content of 30%.

The properties of the emulsion are shown in Table 3.

TABLE 3

| Emulsion | Mechanical stability | Freeze-thaw stability | Stability at low temp. |
|---|---|---|---|
| Ex. 14 | epoxy emulsion | B | B | B |
| Com. Ex. 7 | epoxy emulsion | B | D | C |
| Ex. 15 | hexadecylketene dimer emulsion | A | A | A |
| Com. Ex. 8 | hexadecylketene dimer emulsion | B | C | B |
| Ex. 16 | atactic polypropylene emulsion | A | A | B |

(Note)
Mechanical stability is determined by employing a Maron type testing machine which is rotated at a high speed at 30° C. for 10 minutes under 10 kg. in load, and estimating the amount of agglomerate produced according to the following criteria.
A: less than 1% (very good)
B: 1 to 25% (good)
C: 25 to 50% (bad)
D: 50 to 100% (very bad)

EXAMPLE 17

A polyvinyl acetate emulsion adhesive for wood containing predominantly the following components was prepared as follows:

Polyvinyl acetate—100 parts
Acetoacetylated PVA as protective colloid (average degree of polymerization: 1,800, residual acetyl content: 1% by mole, acetoacetyl content: 3.8% by mole)—8 parts
Dibutyl phthalate—10 parts
Water—144 parts A glass polymerization vessel was charged with 136 parts of water and 8 parts of the protective colloid. After raising the temperature to 60° C. and dissolving the protective colloid, the temperature was raised to 75° C. and emulsion polymerization was carried out by adding dropwise 100 parts of vinyl acetate and 8 parts of a 5% aqueous solution of ammonium persulfate over 3.5 hours. The mixture was further maintained at that temperature for 1 hour to complete the polymerization, and 10 parts of dibutyl phthalate was added to the emulsion. The mixture was cooled and the solid content was adjusted to 45% to give an adhesive.

EXAMPLE 18

A polyvinyl acetate emulsion adhesive for wood having a solid content of 45% was prepared in the same manner as in Example 17 except that the protective colloid was employed in an amount of 4 parts. The main components of the adhesive were as follows:
Polyvinyl acetate—100 parts
The same protective colloid as in Example 17—4 parts
Dibutyl phthalate—10 parts
Water—139 parts

EXAMPLE 19

A polyvinyl acetate emulsion adhesive for wood having a solid content of 42% and a viscosity of 200,000 cP was prepared in the same manner as in Example 17 except that the following acetoacetylated PVA was employed as a protective colloid in an amount of 12 parts. The main components of the adhesive were as follows:
Polyvinyl acetate—100 parts
Acetoacetylated PVA as protective colloid (average degree of polymerization: 1,800, residual acetyl content: 1% by mole, acetoacetyl content: 6.8% by mole)—12 parts
Dibutyl phthalate—10 parts
Water—168 parts

EXAMPLE 20

A polyvinyl acetate emulsion adhesive for wood having a solid content of 50% was prepared in the same manner as in Example 17 except that the following acetoacetylated PVA was employed as a protective colloid in an amount of 10 parts. The main components of the adhesive were as follows:
Polyvinyl acetate—100 parts
Acetoacetylated PVA as protective colloid (average degree of polymerization: 1,000, residual acetyl content: 1% by mole, acetoacetyl content: 2.3% by mole)—10 parts
Dibutyl phthalate—10 parts
Water—120 parts

EXAMPLE 21

A polyvinyl acetate emulsion adhesive for wood having a solid content of 45% was prepared in the same manner as in Example 17 except that the following acetoacetylated PVA was employed as a protective colloid in an amount of 10 parts. The main components of the adhesive were as follows:
Polyvinyl acetate—100 parts
Acetoacetylated PVA as protective colloid (average degree of polymerization: 1,800, residual acetyl content: 12% by mole, acetoacetyl content: 3.8% by mole)—10 parts
Dibutyl phthalate—10 parts
Water—146 parts

EXAMPLE 22

An ethylene-vinyl acetate copolymer emulsion adhesive for wood containing predominantly the following components was prepared as follows:
Ethylene-vinyl acetate copolymer having an ethylene content of 15%—100 parts
The same protective colloid as in Example 17—8 parts
Water—132 parts A polymerization autoclave was charged with 100 parts of water and 8 parts of the same protective colloid as used in Example 17, and the temperature was raised to 60° C. and the protective colloid was dissolved. Ethylene was then supplied into the autoclave. After raising the temperature to 75° C., emulsion polymerization was carried out by simultaneously adding dropwise 85 parts of vinyl acetate and 8 parts of a 5% aqueous solution of ammonium persulfate to the autoclave over 4 hours, while maintaining the inner pressure at 30 kg.cm.$^2$ by the supply of ethylene. After dropping the ethylene pressure, the reaction mixture was further maintained at 75° C. for 1 hour, and was adjusted to 45% in solid content to provide an adhesive.

EXAMPLE 23

A polyvinyl acetate emulsion adhesive for wood having a solid content of 43% was prepared in the same manner as in Example 17 except that dibutyl phthalate was not employed.

COMPARATIVE EXAMPLE 9

A polyvinyl acetate emulsion adhesive for wood having a solid content of 45% was prepared in the same manner as in Example 17 except that PVA was employed as a protective colloid instead of the acetoacetylated PVA. The main components of the adhesive were as follows:
Polyvinyl acetate—100 parts
PVA as protective colloid (average degree of polymerization: 1,800, residual acetyl content: 1% by mole)—8 parts
Dibutyl phthalate—10 parts
Water—144 parts

COMPARATIVE EXAMPLE 10

A polyvinyl acetate emulsion adhesive for wood having a solid content of 50% was prepared in the same manner as in Example 17 except that PVA was employed as a protective colloid instead of the acetoacetylated PVA. The main components of the adhesive were as follows:
Polyvinyl acetate—100 parts
PVA as protective colloid (average degree of polymerization: 1,800, residual acetyl content: 12% by mole)—8 parts
Dibutyl phthalate—10 parts
Water—118 parts

COMPARATIVE EXAMPLE 11

An adhesive for wood was prepared by admixing 100 parts of the same polyvinyl acetate emulsion as prepared in Comparative Example 10, 100 parts of a 70% urea resin and 5 parts of a curing agent.

COMPARATIVE EXAMPLE 12

A polyvinyl acetate emulsion adhesion for wood having a solid content of 50% was prepared in the same manner as in Comparative Example 9 except that dibutyl phthalate was not employed.

The adhesives prepared in Examples 17 to 23 and Comparative Examples 9 to 12 were subjected to the following tests.
(1) Miscibility with urea resin
(According to JIS K 6804)
(2) Stability in viscosity at low temperatures Viscosities at 5° C. and 25° C. are measured and the stability is indicated by the ratio of the viscosity at 5° C. to the viscosity at 25° C.

(3) Adhesion force in plywood

An adhesive is coated on both surfaces of a lauan veneer having a thickness of 1.4 mm., a width of 25 mm. and a length of 75 mm. in an amount of 100 g./m.$^2$ as a solid content per one surface, and is then sandwiched with two sheets of lauan veneers having a thickness of 0.8 mm, a width of 25 mm. and a length of 75 mm. They are then pressed under a pressure of 10 kg./cm.$^2$ for 4 hours to give a test specimen. Four pieces of such specimens are prepared. With respect to the obtained specimens, according to methods provided in Japanese Agricultural and Forestry Standard for usual plywoods, type-three plywood (JAS III) test, type-two plywood (JAS II) test and type-one plywood (JAS I) test are conducted.

(4) Adhesion force in paper-overlaid plywood

An adhesive is coated on the surface of a lauan plywood (classified as "JAS I") having a thickness of 3 mm., a width of 75 mm. and a length of 75 mm. in an amount of 100 g./m.$^2$ as a solid content. A paper coated with titanium dioxide (basis weight: 80 g./m.$^2$) having the same area as the plywood is then laminated onto the plywood by a roller under a load of 2 kg., and is cured at room temperature for 48 hours to provide a test specimen of a paper-overlaid plywood. Four pieces of such specimens are prepared. According to Japanese Agricultural and Forestry Standard for special plywood, the test specimens are subjected to type-one special plywood (JAS I) test and type-two special plywood (JAS II) test.

The results of the tests are shown in Table 4.

TABLE 4

| | Adhesive | | | | | | | | |
|---|---|---|---|---|---|---|---|---|---|
| | Resin | | Protective colloid | | | | Dibutyl phthalate (part) | Viscosity (cP) | Solid content (%) |
| | Kind | Amount (part) | Kind | AA (mole %) | RA (mole %) | $\bar{P}$ | Amount (part) | | | |
| Ex. 17 | polyvinyl acetate | 100 | AA-PVA | 3.8 | 1 | 1800 | 8 | 10 | 62000 | 45 |
| Ex. 18 | polyvinyl acetate | 100 | AA-PVA | 3.8 | 1 | 1800 | 4 | 10 | 21000 | 45 |
| Ex. 19 | polyvinyl acetate | 100 | AA-PVA | 6.8 | 1 | 1800 | 12 | 10 | 200000 | 42 |
| Ex. 20 | polyvinyl acetate | 100 | AA-PVA | 2.3 | 1 | 1000 | 10 | 10 | 53000 | 50 |
| Ex. 21 | polyvinyl acetate | 100 | AA-PVA | 3.8 | 12 | 1800 | 10 | 10 | 71000 | 45 |
| Ex. 22 | ethylene-vinyl acetate copolymer | 100 | AA-PVA | 3.8 | 1 | 1800 | 8 | — | 49000 | 45 |
| Ex. 23 | polyvinyl acetate | 100 | AA-PVA | 3.8 | 1 | 1800 | 8 | — | 75000 | 43 |
| Com. Ex. 9 | polyvinyl acetate | 100 | PVA | — | 1 | 1800 | 8 | 10 | 150000 | 45 |
| Com. Ex. 10 | polyvinyl acetate | 100 | PVA | — | 12 | 1800 | 8 | 10 | 64000 | 50 |
| Com. Ex. 11 | polyvinyl acetate + urea resin | 100 + 100 | PVA | — | 12 | 1800 | 8 | — | — | — |
| Con. Ex. 12 | polyvinyl acetate | 100 | PVA | — | 1 | 1800 | 8 | — | 20000 | 50 |

| | Property of wood adhesive | | | | | | |
|---|---|---|---|---|---|---|---|
| | Adhesion force in plywood (kg./cm.$^2$) | | | Adhesion force in paper-overlaid plywood | | Miscibility with urea resin | Stability at low temp. |
| | JAS III | JAS II | JAS I | JAS I | JAS II | | |
| Ex. 17 | 14 | 8.1 | 8.7 | ○ | ○ | ○ | 1.2 |
| Ex. 18 | 16 | 8.5 | 8.4 | ○ | ○ | ○ | 1.3 |
| Ex. 19 | 14 | 7.8 | 8.0 | ○ | ○ | ○ | 1.0 |
| Ex. 20 | 14 | 8.0 | 7.7 | ○ | ○ | ○ | 1.1 |
| Ex. 21 | 15 | 8.2 | 8.1 | ○ | ○ | ○ | 1.2 |
| Ex. 22 | 13 | 7.9 | 8.0 | ○ | ○ | ○ | 1.3 |
| Ex. 23 | 15 | 11.0 | 9.5 | ○ | ○ | ○ | 1.2 |
| Com. Ex. 9 | 14 | 3.0 | 2.0 | X | ○ | X | 4.0 |
| Com. Ex. 10 | 15 | 0.7 | 2.2 | X | ○ | ○ | 1.6 |
| Com. Ex. 11 | 14 | 9.5 | 0 | X | ○ | — | — |

TABLE 4-continued

| | | | | | | | |
|---|---|---|---|---|---|---|---|
| Ex. 12 | 15 | 5.0 | 4.5 | X | O | X | 3.8 |

(Note)
AA-PVA: Acetoacetylated PVA
AA: Acetoacetyl content
RA: Residual acetyl content
P: Average degree of polymerization
O: pass
X: reject

EXAMPLE 24 AND COMPARATIVE EXAMPLE 13

Bond of A-flute corrugated board was conducted by a corrugating machine employing PVA having an average degree of polymerization of 1,400, an average degree of hydrolysis of 99.3% by mole and a particle size of 200 to 350 meshes and an ethylene-vinyl acetate copolymer emulsion containing 1% of an acetoacetylated PVA (average degree of polymerization: 1,700, residual acetyl content: 1% by mole, acetoacetyl content: 2.3% by mole) under the following conditions.

Composition of adhesive (viscosity: 1250 cP at 40° C.)

| Component A: | |
|---|---|
| Water charged | 540 liters |
| PVA powder | 120 kg. |
| Clay | 80 kg. |
| Borax | 1 kg. |
| Carboxymethyl cellulose | 3 kg. |
| Component B: | |
| Ethylene-vinyl acetete emulsion of 50% in solid content (ethylene content: 30% by mole) | 60 kg. |
| Additive: | |
| 80% methylolmelamine | 20 kg. |

Structure of corrugated board

Liner: basis weight 240 g./m.$^2$, water proof K liner
Corrugating medium: basis weight 160 g./m.$^2$, water proof SCP corrugating medium Machine condition Designed speed: 150 m./min.
Temperatures of press roll and corrugating roll: 160° C.
Press roll pressure: 5 kg./cm.$^2$ As a control, the above procedure was repeated except that an ethylene-vinyl acetate copolymer emulsion containing no acetoacetylated PVA was employed.

Adhesive strength of the obtained corrugated boards was measured. Dry adhesive strength and wet adhesive strength were measured according to JIS Z 0402.

The results are shown in Table 5.

TABLE 5

| | Maximum bonding speed (m./min.) | Adhesive strength (kg.) | | | |
|---|---|---|---|---|---|
| | | Single-faced product | | Double-faced product | |
| | | Dry | Wet | Dry | Wet |
| Ex. 24 | 80 | 32.7 | 3.7 | 40.2 | 18.7 |
| Control | 70 | 30.6 | 2.2 | 38.7 | 10.8 |

Upon bonding, a single-faced corrugated board was taken as test specimens, and subjected to the following tests.

The above adhesive was coated on the flute tops of the board in an amount of 10 g./m.$^2$ as a solid content, and thereon a liner having a basis weight of 240 g./m.$^2$ was superposed and was adhered with heating by an iron (pressure applied: 50 g./cm.$^2$, surface temperature: 150° C.) Initial adhesion force, dry adhesive strength and wet adhesive strength were measured.

The same procedure as above was repeated except that the component B of the adhesive was not employed and carboxymethyl cellulose was employed in an amount of 1.7 kg. (Comparative Example 13).

The results are shown in Table 6.

TABLE 6

| | Amount of application as solid (g./m.$^2$) | Initial adhesion force Heating time (sec.) | | | Dry adhesive strength (kg.) | Wet adhesive strength (kg.) |
|---|---|---|---|---|---|---|
| | | 9 | 12 | 15 | | |
| Ex. 24 | 9.8 | Δ | O | ⊚ | 39.2 | 20.1 |
| Com. Ex. 13 | 10.1 | Δ | O | O | 38.6 | 13.2 |

(1) Initial adhesion force

After heating for 9, 12 or 15 seconds for adhesion, the corrugating medium and the liner are immediately peeled off, and the state of transfer of the corrugating medium pulp to the liner is estimated according to the following criteria.
⊚: Transfer of whole surface
X: No transfer
Δ: Middle of ⊚ and X (2) Dry adhesive strength A test specimen adhered by heating for 10 seconds is conditioned at 20° C. in temperature and 65% in relative humidity for 24 hours, and the adhesive strength is measured according to JIS Z 0402.

(3) Wet adhesive strength

After heating for 10 seconds for adhesion, a test specimen is immersed in water at 20° C. for 1 hour, and the adhesive strength is measured according to JIS Z 0402.

EXAMPLE 25

(Preparation of ethylene-vinyl acetate copolymer emulsion)

A pressure polymerization vessel was charged with 50 parts of vinyl acetate, 150 parts of water and 3 parts of an acetoacetylated PVA (degree of polymerization: 1,400, residual acetyl content: 1% by mole, acetoacetyl content: 3% by mole), and vinyl acetate was emulsified. Potassium persulfate was employed as a polymerization initiator, and ethylene was supplied to the vessel until the pressure become 50 atms. The polymerization was carried out for 10 hours at 60° C. to give an emulsion of a copolymer of ethylene and vinyl acetate in a ratio of 80:20 by weight.

(Preparation of cement mortar)

According to the testing method of water proofing agent for cement for building construction provided in JIS A 6101(1953), the above emulsion was blended with a mixture of normal Portland cement and Toyoura standard sand (ratio of resin in emulsion to cement = 20:80 by weight), as shown in Table 7.

There was measured properties of the obtained mortar, such as strength, water absorption, adhesion property, impact resistance and abrasion resistance.

With respect to a normal cement mortar containing no ethylene-vinyl acetate copolymer emulsion, the same procedure as above was conducted.

The results are shown in Table 7.

TABLE 7

|  | Ex. 25 | Control |
|---|---|---|
| Ratio of normal Portland cement to Toyoura standard sand | 1:3 | 1:3 |
| Ratio of resin in emulsion to cement | 20:80 | 0 |
| Ratio of water to cement | 45.6:54.4 | 72.5:27.5 |
| Flow value of mortar (mm.) | 170 | 162 |
| Flexural strength (kg./cm.$^2$) | | |
| Curing in water for 28 days | 42.6 | 44.3 |
| Dry curing for 28 days | 65.6 | 30.2 |
| Compression strength (kg./cm.$^2$) | | |
| Curing in water for 28 days | 189 | 202 |
| Dry curing for 28 days | 242 | 154 |
| Water absorption (%) | 2.4 | 11.4 |
| Adhesive strength to normal cement mortar (kg./cm.$^2$) | | |
| (dry strength) | 15.1 | 5.3 |
| Impact resistance (height of drop of steel globe till breaking) (cm.) | 110 | 25 |
| Abrasion resistance (Taber index) | 454 | 19,100 |

EXAMPLE 26

A web having a dry weight of 100 g./m.$^2$ made of polyethylene terephthalate filaments was dipped in an emulsion of ethylene-vinyl acetate-N-methylolacrylamide copolymer (70:25:5 by weight) (content of resin: 15%) containing 5% of an acetoacetylated PVA (degree of polymerization: 1,700, residual acetyl content: 0.1% by mole, acetoacetyl content: 5% by mole). The dipped web was wringed by a mangle, and was pre-dried at 80° C. for 20 minutes and then dried at 150° C. for 5 minutes. The resin pick-up in the web after drying was 60% of the weight of the web before dipping.

The properties of the obtained non-woven fabric are shown in Table 8.

TABLE 8

|  | Ex. 26 |
|---|---|
| Tensile strength in ordinary state (kg./cm.$^2$) | 2.6 |
| Elution of resin by trichlene (%) | 6.8 |
| Tensile strength after dry cleaning (kg./cm.$^2$) | 2.5 |
| Crease resistance (degree) | 105 |
| Change in color | none |

TABLE 8-continued

|  | Ex. 26 |
|---|---|
| Bending resistance (cm.) | 131 |

NOTE:
1. Tensile strength in ordinary state
A test specimen having a size of 1 × 1.5 cm. is conditioned at 20° C. in temperature and 65% in relative humidity, and tensile strength at breaking is measured by employing an Instron universal tension tester (space of span: 5 cm.)
2. Tensile strength after dry cleaning
A test specimen having a size of 1 × 1.5 cm. is dipped in trichlene at 20° C. for 30 minutes, and after air-drying and further drying it at a temperature of 80° to 100° C. for 30 minutes, tensile strength at breaking is measured by an Instron universal tension tester (space of span: 5 cm.)
3. Elution of resin by trichlene
A test specimen having a size of 6 × 6 cm. is put in 3 liters of trichlene of ordinary temperature, and is vigorously agitated for 5 minutes to extract. The treated specimen is then air-dried and further dried at a temperature of 80° to 100° C. for 30 minutes, and is weighed. The elution is indicated by reduction percentage in weight on the basis of the weight of the specimen before treatment.
4. Crease resistance
A test specimen having a size of 1 × 4 cm. is folded at the center under conditions of 20° C. in temperature and 65% in relative humidity, and a load of 500 g. is applied to the folded portion for 5 minutes. The load is then removed, and after 5 minutes, crease recovery angle of the specimen is measured.
5. Change in color
A test specimen is radiated for 200 hours by a weather-o-meter, and change in color is observed by the naked eye.
6. Bending resistance
By employing a test specimen having a size of 2 × 10 cm., bending resistance is measured by a 45° cantilever method under conditions of 20° C. in temperature and 65% in relative humidity.

EXAMPLES 27 AND 28 AND COMPARATIVE EXAMPLE 14

An emulsion as shown in Table 9 containing an acetoacetylated PVA (residual acetyl content: 1% by mole, acetoacetyl content: 3% by mole) was coated on a cotton drill by a coater in an amount of 100 g./m.$^2$ as a solid content. A Nylon pile (3 deniers, 0.5 mm. in length) was flocked on the coated drill by an antistatic flocking machine. The flocked drill was pre-dried at a temperature of 80° to 100° C. for 20 minutes and then dried at a temperature of 120° to 145° C. for 5 minutes.

The above procedure was repeated except that an emulsion containing no acetoacetylated PVA was employed.

The results of the measurement of properties of the obtained flocked cloths are shown in Table 9.

TABLE 9

|  | Ex. 27 | Ex. 28 | Com. Ex. 14 |
|---|---|---|---|
| Emulsion | | | |
| Ethylene-vinyl acetate copolymer | | | |
| Vinyl acetate content | 80 | 70 | 80 |
| Ethylene content | 20 | 30 | 20 |
| N-methylolmelamine (proportion in resins) (%) | 5 | 5 | 5 |
| Acetoacetylated PVA (content) (%) | 3 | 4 | — |
| Weight decrease by abrasion (%) | 3.8 | 3.9 | 9.3 |
| Bending strength (cm.) | | | |
| Normal state | 4.5 | 4.6 | 4.0 |
| After dry cleaning | 4.0 | 4.1 | 2.0 |

NOTE:
Weight decrease by abrasion is indicated by decrease percentage in weight when the surface of a test specimen is rubbed 300 times with an emery paper No. 600 under a pressure of 0.454 kg. by employing an abrasion tester.

EXAMPLES 29 AND 30

An acetoacetylated PVA (residual acetyl content: 0.1% by mole, acetoacetyl content: 5% by mole) was added to an emulsion of a vinyl acetate-Veova-acrylic acid (80:16:4 by weight) and an emulsion of an ethylene-vinyl acetate copolymer (70:30 by weight) in amounts of 2% and 5%, respectively, based on the weight of the solid content in the emulsion.

By employing the prepared emulsions, pigment coating was conducted on a paper having a basis weight of 85 g./m.$^2$ by Dixon coater at a speed of 10 m./min. The amount of application was about 20 g./m.$^2$ The coated paper was then surface-treated by a super calender roll under conditions of 60° C. in surface temperature, 100 kg./cm. in line pressure and 7.5 m./min. in speed. The surface properties of the obtained coated papers were measured.

The results are shown in Table 10.

TABLE 10

|  | Ex. 29 | Ex. 30 |
|---|---|---|
| Wet rub resistance (%) | 98 | 96 |
| Whiteness (%) | 82.0 | 81.8 |
| Gloss (%) | 75.4 | 67.7 |

(NOTE)
Wet rub resistance: A test specimen is rubbed 100 times with a rubber band of 125 g. in pressure by employing Abraser made by Taber Co., and water used for wetting is collected and the percent transmission is measured to indicate the turbidity.
Whiteness: According to JIS P 8123
Gloss: According to JIS P 8142

EXAMPLE 31

By employing the emulsions obtained in Examples 1, 4, 5 and 6, emulsion type flat paints (a), (b), (c) and (d) having the following composition were prepared and coated on glass plates and flexible boards in amounts of 150 to 200 g./m.$^2$ as a solid content, respectively. The coated plates and boards were dried at 25° C. for 5 days, and subjected to the following tests.

The results are shown in Table 11.

Composition of flat paint

| Emulsion (solid content: 50%) | 1,200 parts |
|---|---|
| 2% Aqueous solution of hydroxyethyl cellulose | 250 parts |
| Dispersing agent for pigment | 20 parts |
| Calcium carbonate | 420 parts |
| Titanium dioxide | 780 parts |
| 25% aqueous ammonia | 5 parts |
| Water | about 200 parts |

Test (1) Adhesion (cross cutting method)

By employing a coated glass palte as a specimen, eleven cut lines spaced apart by 3 mm. are formed in vertical and horizontal directions, respectively, to give 100 squares. A cellophane adhesive tape is stuck to the cut coating and suddenly peeled off, and the state of peeling is observed according to the following criteria.
○: No peeling
Δ: Partial peeling
X: Complete peeling (2) Water resistance A coated flexible board is used as a specimen. Water is added to a glass vessel up to 150 mm. in depth, and a specimen is dipped in water in a depth of about 120 mm. After dipping for 96 hours, the specimen was taken out and the state of the coating is immediately observed. The specimen showing no change such as wrinkles, cracks, swelling and peeling is stood in a room for 2 hours, and the state of the coating is observed again. When the coating does not show wrinkles, cracks, swelling and peeling and the large difference in color and gloss between the dipped portion and the non-dipped portion, the water resistance is regarded as good. When there is abnormality in coating, the water resistance is regarded as bad.

(3) Washability

A coated glass plate is used as a specimen. By employing a Gardner washability testing machine, the number of times till breaking of the coating is measured, in which going and returning movements are regarded as one time.

EXAMPLE 32

By employing the emulsions obtained in Examples 1, 4, 5 and 6, paints (a), (b), (c) and (d) having the following composition were prepared and coated on flexible boards by a trowel in an amount of about 1 kg./m.$^2$ as a solid content, respectively. The coated boards were dried at 25° C. for 5 days, and subjected to the following tests.

Composition of paint

| Emulsion (solid content: 50%) | 100 parts |
|---|---|
| Canary broken stone (particle size: about 2 mm.) | 2,000 parts |

The viscosity of the paint was adjusted to 20,000 to 30,000 cP by employing water or an acetoacetylated PVA.

(1) Water resistance: The same as in Example 31.

(2) Anti-staining

A specimen is subjected to outdoor exposure test for 3 months and is washed with water, and the state of staining is observed as compared with a non-exposed specimen according to the following criteria.
○: Little staining
Δ: Slight staining
X: Remarkable staining The results are shown in Table 11.

EXAMPLE 33

By employing the emulsions obtained in Examples 1, 4, 5 and 6, stucco-like coatings (a), (b), (c) and (d) having the following composition were prepared and sprayed on flexible boards by a mortar gun in an amount of about 1 kg./m.$^2$ as a solid content. The sprayed boards were dried at 25° C. for 5 days, and subjected to the following tests.

Composition of paint

| Emulsion (solid content: 50%) | 200 parts |
|---|---|
| Calcium carbonate (5 μm.) | 400 parts |
| Calcium carbonate (50 μm.) | 100 parts |
| Calcium carbonate (100 μm.) | 100 parts |
| Pulp fiber | 10 parts |
| Talc | 50 parts |
| Dispersing agent for pigment | 1 part |

The viscosity of the paint was adjusted to about 20,000 cP by employing water or an acetoacetylated PVA.

(1) Water resistance: The same as in Example 31
(2) Shape of pattern

The shape of patter is estimated according to the following criteria.
○: Near semicircle
X: Scattering or crushing
Δ: Middle of ○ and X The results are shown in Table 11.

TABLE 11

|  | a | b | c | d |
|---|---|---|---|---|
| Example 31 | | | | |
| Adhesion | ○ | ○ | ○ | ○ |
| Water resistance | good | good | good | good |
| Washability | 3000< | 3000< | 3000< | 3000< |
| Example 32 | | | | |
| Water resistance | ○ | ○ | ○ | ○ |
| Anti-staining | ○ | ○ | ○ | ○ |
| Example 33 | | | | |
| Water resistance | ○ | ○ | ○ | ○ |
| Shape of pattern | ○ | ○ | ○ | ○ |

What we claim is:

1. An aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

2. The emulsion of claim 1, wherein said synthetic resin is a polymer of a vinyl compound.

3. The emulsion of claim 2, wherein said polymer of a vinyl compound is a vinyl acetate polymer.

4. An adhesive which comprises an aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

5. The adhesive of claim 4, wherein said emulsion is an emulsion of a vinyl acetate polymer.

6. A treating agent for fiber and textile which comprises an aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

7. A paint which comprises an aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

8. A paper coating material which comprises an aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

9. A cement modifier which comprises an aqueous emulsion of a synthetic resin containing an acetoacetylated polyvinyl alcohol as a protective colloid, wherein the acetoacetyl content of the acetoacetylated polyvinyl alcohol is from 0.05 to 15% by mole and the residual acetyl content of the acetoacetylated polyvinyl alcohol is from 0.1 to 15% by mole.

* * * * *